US 6,561,659 B1

(12) United States Patent
Hsu

(10) Patent No.: US 6,561,659 B1
(45) Date of Patent: May 13, 2003

(54) PHOTOCONDUCTOR PANEL FOR LIGHTING A KEYBOARD

(75) Inventor: Chen-Chang Hsu, Taichung (TW)

(73) Assignee: Wintek Corporation, Taichung (TW)

(*) Notice: Subject to any disclaimer, the term of this patent is extended or adjusted under 35 U.S.C. 154(b) by 0 days.

(21) Appl. No.: 09/987,524

(22) Filed: Nov. 15, 2001

(51) Int. Cl.[7] .............................................. H04M 1/22
(52) U.S. Cl. .......................... 362/24; 362/88; 362/30; 349/65
(58) Field of Search .......................... 362/24, 88, 555, 362/561, 558, 30, 31, 240, 236; 349/65, 62

(56) References Cited

U.S. PATENT DOCUMENTS 5,746,493 A * 5/1998 Jonsson et al. ............... 362/23
5,975,711 A * 11/1999 Parker et al. ............... 200/314
6,006,118 A * 12/1999 Stephenson .................. 362/24
6,435,686 B1 * 8/2002 Gotou ......................... 362/31

* cited by examiner

*Primary Examiner*—Sandra O'Shea
*Assistant Examiner*—Hargobind S. Sawhney
(74) *Attorney, Agent, or Firm*—Rosenberg, Klein & Lee

(57) ABSTRACT

A photoconductor panel for lighting a keyboard. The photoconductor panel is disposed in an electronic product having a liquid crystal module and a keyboard. The photoconductor panel is disposed on the bottom of the liquid crystal module. The photoconductor panel has a photoconduction face facing the liquid crystal module. At least one side of the photoconduction face has multiple photoconduction sections for conducting light beam to the photoconduction face. At least one light source is disposed on one side of the photoconduction face. A portion of the photoconductor panel is further formed with multiple through holes corresponding to the touch sections of the keyboard and the touch buttons. The circumference of each through hole is formed with at least one second photoconduction section for conducting light beam upward.

5 Claims, 4 Drawing Sheets

PHOTOCONDUCTOR PANEL FOR LIGHTING A KEYBOARD

BACKGROUND OF THE INVENTION

The present invention is related to a photoconductor panel for lighting a keyboard. The photoconductor panel is disposed in an electronic product and has photoconduction structures corresponding the peripheries of the display panel and keyboard of the electronic product. The light beam of few light source is effectively utilized to provide full illumination for both the display panel and the keyboard.

In order to provide sufficient brightness for the display 91 of a conventional electronic product (as shown in FIG. 5), a photoconductor panel 92 is disposed on the bottom of the liquid crystal module 94 and a light emitting diode (LED) is used as a light source 93. However, the LED serves as a point light source so that the portion of the photoconductor panel 92 right in front of the light source 93 will have densest brightness. The brightness will decline from the portion to the edge of the photoconductor panel 92. The brightness on the edge is often nearly zero. With the light source 93 disposed at the middle of two sides of the photoconductor panel 92, if there is no good photoconduction structure for conducting light beam to two sides of the photoconductor panel 92, the brightness will be uneven. In order to overcome the problems of insufficient brightness and unevenness thereof, some manufacturers have tried to arrange multiple light sources 93 along the periphery of the liquid crystal module 94 (as shown in the mobile phone of FIG. 6) to supplement the brightness and evenness. However, the multiple light sources 93 lead to high power consumption. This is problematic to those electronic products necessitating frequent charging. Such electronic products are often equipped with a keyboard 95 for inputting data. In a dark place, it is important to illuminate the keyboard 95. In order to overcome the problem of illumination, multiple light sources 93 are additionally disposed on the bottom of the keyboard 95. These light sources 93 also result in high power consumption. Moreover, more light sources 93 lead to higher manufacturing cost.

SUMMARY OF THE INVENTION

It is therefore a primary object of the present invention to provide a photoconductor panel for lighting a keyboard. The photoconductor panel is made by means of integral injection molding for optical element. By means of the optical properties of the photoconduction face and the photoconduction sections and photoconduction grooves along the circumference of the through hole of the photoconductor panel, the light beam of few light source is effectively utilized to provide full illumination for both the liquid crystal module and the keyboard. Accordingly, the power consumption is reduced so that the battery of the electronic product can be more durably used.

It is a further object of the present invention to provide the above photoconductor panel in which the photoconduction face and photoconduction structures necessary for both the liquid crystal module and the keyboard are integrally made so that the manufacturing cost is lowered.

The present invention can be best understood through the following description and accompanying drawings wherein:

DETAILED DESCRIPTION OF THE PREFERRED EMBODIMENT

Figure 1:
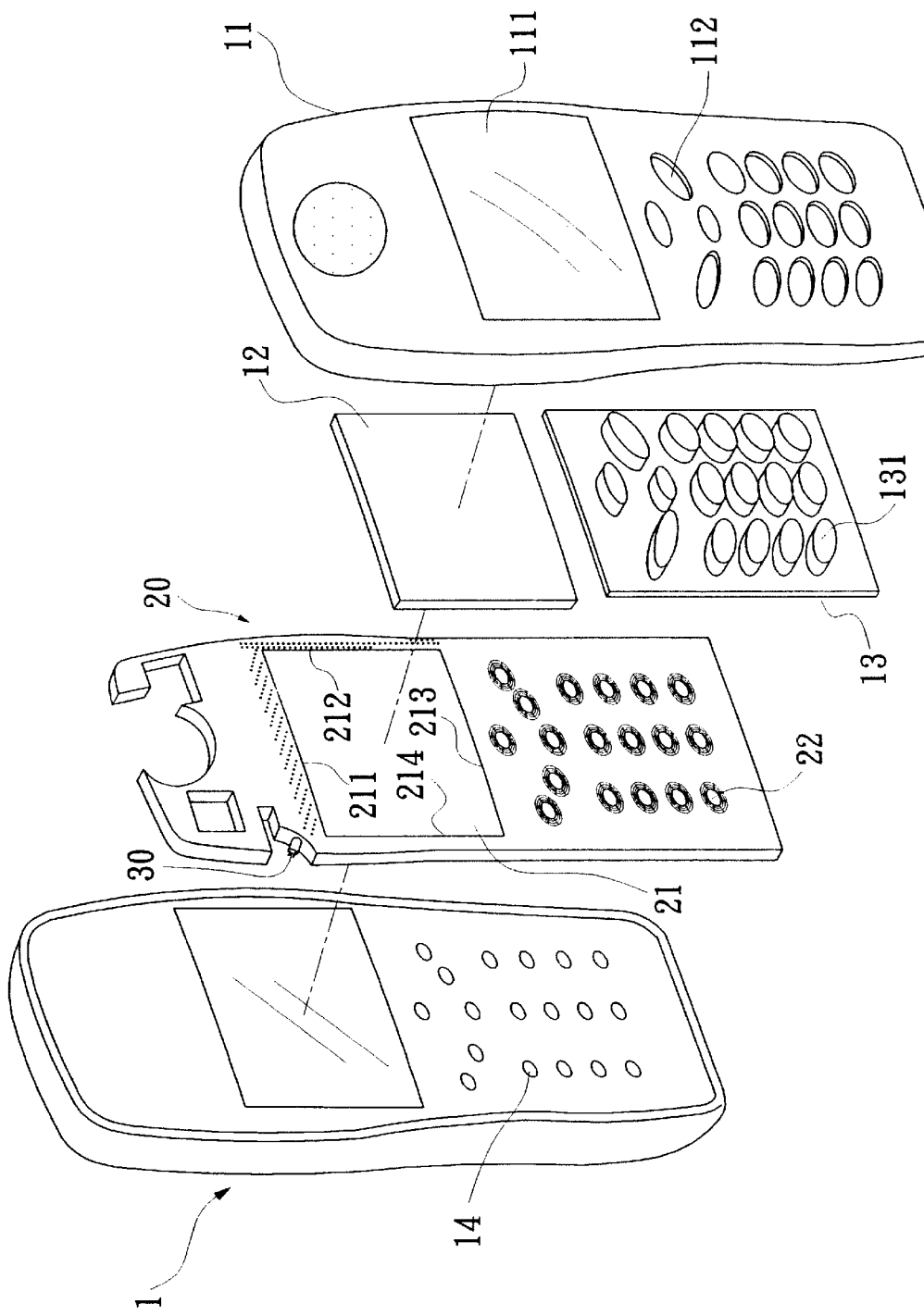
FIG. 1 is a perspective exploded view of the present invention disposed in a mobile phone.

Please refer to FIGS. 1 to 4. The present invention is disposed in a mobile phone 1 having a front casing 11. The front casing 11 has a transparent window 111 and multiple keyholes 112. A rectangular liquid crystal module 12 is disposed in the mobile phone 1 corresponding to the window 111. A keyboard 13 is arranged in the mobile phone 1 corresponding to the multiple keyholes 112. The keyboard 13 has multiple keys 131 protruding through the keyholes 112. The bottom of each key 131 has a downward extending boss 132 for touching a touch button 14 arranged in the mobile phone 1.

A photoconductor panel 20 is disposed on the bottom of the liquid crystal module 12 in the mobile phone 1. The photoconductor panel 20 has a profile corresponding to the inner periphery of the front casing 11. The photoconductor panel 20 has a photoconduction face 21 facing the liquid crystal module, the photoconduction face 21 has a profile corresponding to that of the liquid crystal module 12. The photoconduction face 21 has a first side 211, a second side 212, a third side 213 and a fourth side 214. The first and third sides 211, 213 are long sides, while the second and fourth sides 212, 214 are short sides. The first and second sides 211, 212 are respectively formed with multiple photoconduction sections 215 for conducting light beam to the photoconduction face 21. In this embodiment, the photoconduction sections 215 are dents. In addition, a light source 30 is disposed at an adjoining section of the first and fourth sides 211, 214. In this embodiment, the light source 30 is an LED. One end of the photoconductor panel 20 distal from the first side 211 is further formed with multiple through holes 22 corresponding to the bosses 132 of the keyboard 13 and the touch buttons 14. The circumference of each through hole 22 is formed with three concentric photoconduction grooves 221 for conducting light beam upward. The photoconduction grooves 221 are upward recessed from the bottom of the photoconductor panel 20. Moreover, the three photoconduction grooves 221 of the same through hole 22 are interconnected via connecting sections 222.

Figure 2:
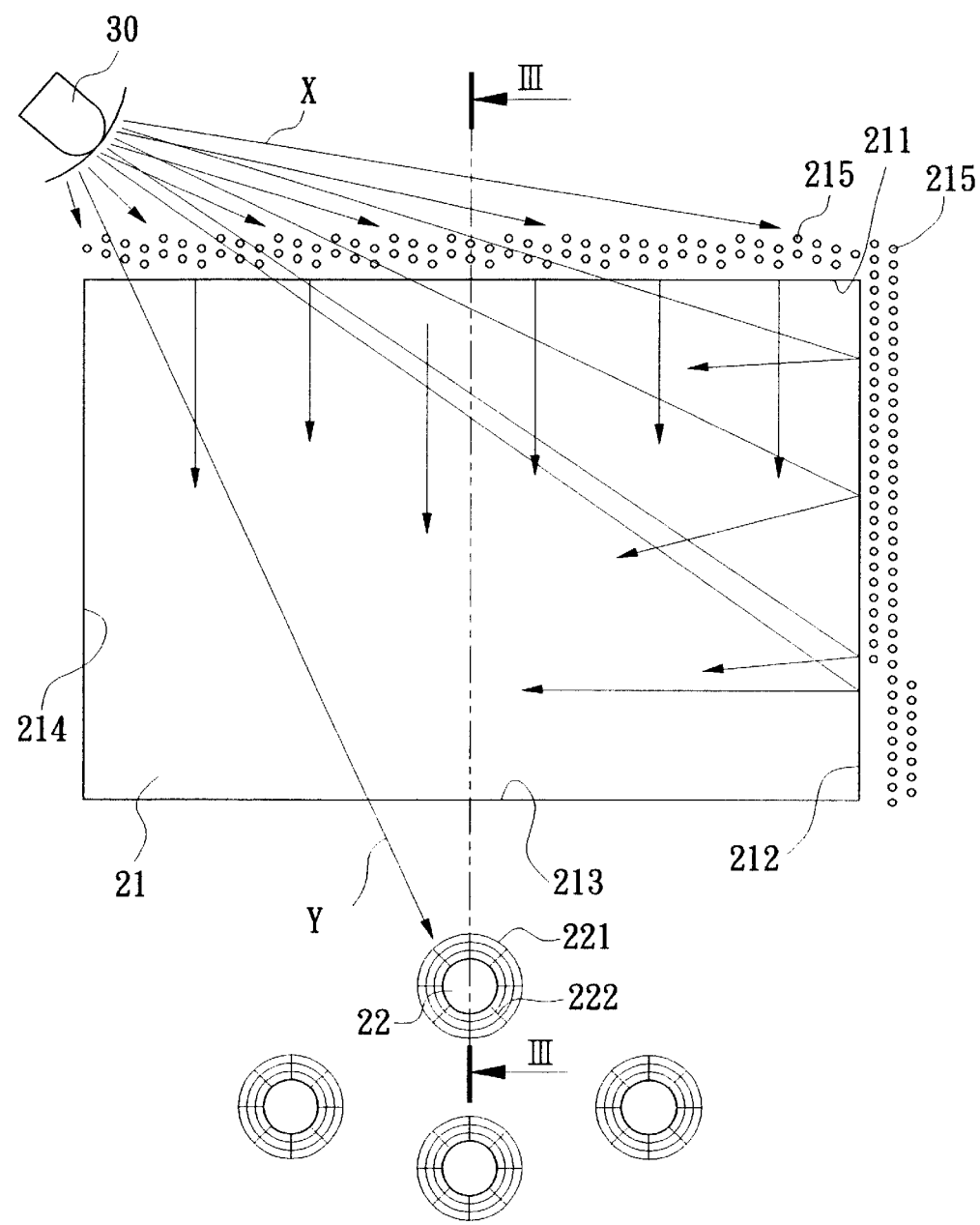
FIG. 2 is a top view showing the path of the light beam generated by the light source of the present invention.
Figure 3:
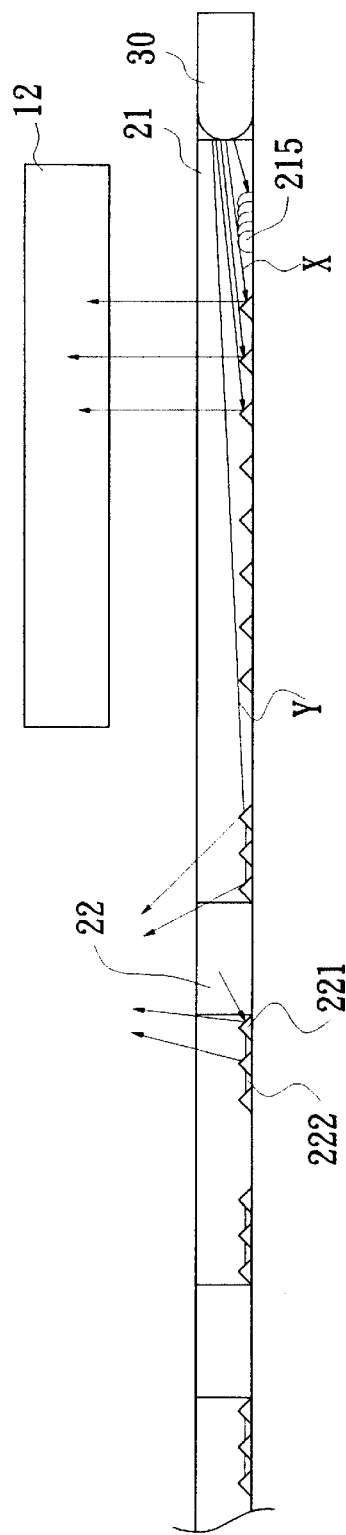
FIG. 3 is a sectional view taken along line III—III of FIG. 2.
Figure 4:
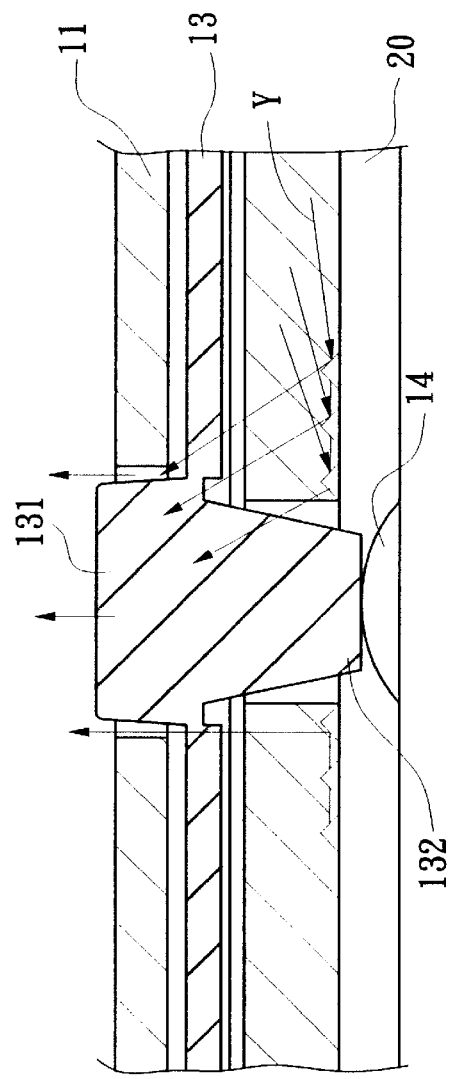
FIG. 4 shows that the light beam generated by the light source is conducted through the periphery of the key.
Figure 5:
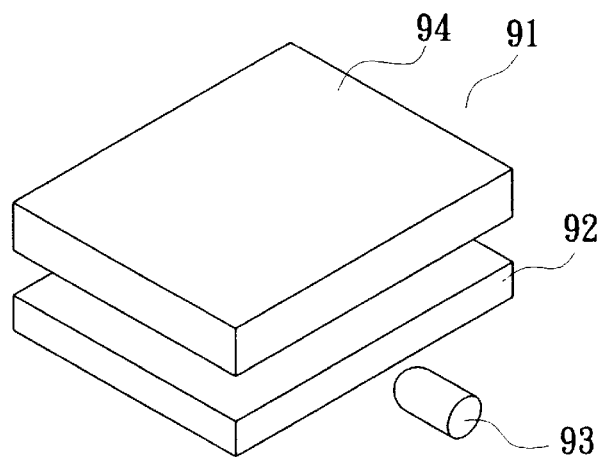
FIG. 5 is a perspective view of a conventional liquid crystal display employing one singe light source.
Figure 6:
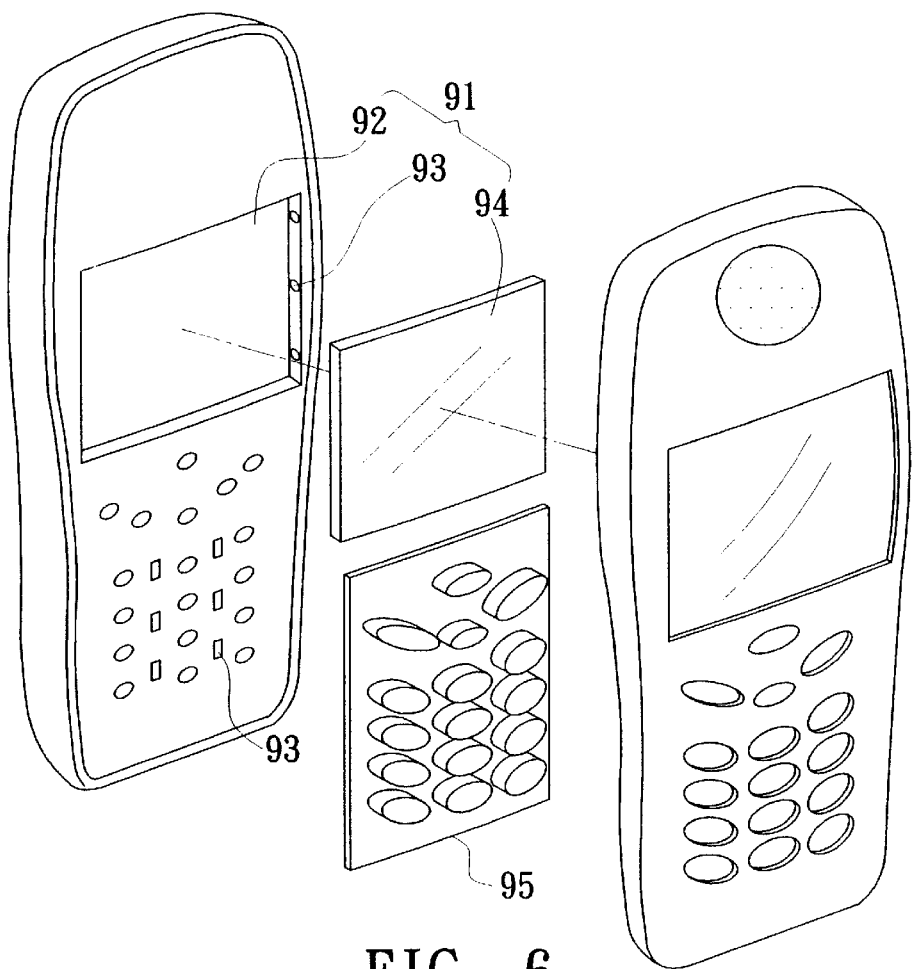
FIG. 6 is a perspective exploded view of a conventional electronic product (mobile phone).

In use, the light source 30 is always turned on. For example, when pressing down any of the keys 131 of the keyboard 13, the boss 132 of the bottom of the key 131 will touch the touch button 14 in the mobile phone 1. This controls the liquid crystal module 12 to display predetermined characters or pictures (not shown). Also, the light source 30 will light. Referring to FIGS. 2 and 3, when the light source 30 lights, a part of the light X goes to the first side 211 and second side 212 of the photoconduction face 21 and is concentratively conducted to the photoconduction face 21 and is upward conducted by the photoconduction face 21 to pass through the liquid crystal module 12 and provide sufficient brightness therefore. Another part of the light Y generated by the light source 30 will reach the through holes 22. The three photoconduction grooves 221 and the connecting sections 222 along the circumferences of the through holes 22 will respectively conduct the light beam Y to the keys 131 of the keyboard 13 or through the peripheries of the keys 131 (as shown in FIG. 4). Therefore, the keyboard 13 can have sufficient brightness. According to the path of the light beam X, Y of the light source 30, the light generated by the light source 30 can be fully utilized to provide sufficient illumination for the liquid crystal module 12 and the keyboard 13. Few light source 30 is necessary for the sufficient illumination so that the power consumption is reduced and the cost for the photoconductor module (particularly the unit composed of the photoconductor panel and the light source) is lowered.

With respect to the manufacturing method of the present invention, the photoconductor panel 20 is made by means of common injection molding for optical element. The mold is formed with structures complementary to the photoconduction face 21, photoconduction sections 215 and photoconduction grooves 221 of the photoconductor panel 20. Accordingly, the photoconductor panel 20 can be integrally made by convenient measure at low price.

In conclusion, the present invention integrally combines a conventional photoconductor panel with a keyboard. By means of the optical properties of the photoconduction face 21 and the photoconduction sections 215 and photoconduction grooves 221 along the circumference of the through hole 22, the light beam of few light source is effectively utilized to provide full illumination for both the liquid crystal module 12 and the keyboard 13. Accordingly, the cost for the light source is lowered and the power consumption is reduced so that the battery of the electronic product can be more durably used.

The above embodiment is only used to illustrate the present invention, not intended to limit the scope thereof. Many modifications of the above embodiment can be made without departing from the spirit of the present invention.

What is claimed is:

1. A keyboard assembly for an electronic product, comprising:
   a liquid crystal module;
   a keyboard having multiple keys disposed adjacent the liquid crystal module, each key having a bottom with a touch section for touching a touch button arranged in the electronic product; and,
   a photoconductor panel disposed on a bottom of the liquid crystal module in the electronic product, the photoconductor panel including:
      a photoconduction face facing the liquid crystal module, the photoconduction face having a profile corresponding to the liquid crystal module, at least one side of the photoconduction face having multiple photoconduction sections for conducting light beams to the photoconduction face;
      at least one light source being disposed on one side of the photoconduction face;
      a portion of the photoconductor panel being further formed with multiple through holes respectively adapted to correspond to the touch sections of the keyboard keys and the touch buttons; and
      a circumference of each of the through holes being formed with at least one second photoconduction section having photoconduction grooves upwardly recessed from a bottom of the photoconductor panel for conducting light beams upwardly, the photoconduction grooves of the same through hole being interconnected via connecting sections.

2. The keyboard assembly of an electronic product as claimed in claim 1, wherein the electronic product is a mobile phone.

3. The keyboard assembly of an electronic product as claimed in claim 1, wherein the electronic product has a front casing, the front casing having a transparent window and multiple keyholes, the window being adapted to correspond to the liquid crystal module and the keyholes each being adapted to correspond to a corresponding one of the keys of the keyboard.

4. The keyboard assembly of an electronic product as claimed in claim 3, wherein the liquid crystal module is rectangular and the photoconductor panel has a profile corresponding to an inner periphery of the front casing, the photoconduction face having a first side, a second side, a third side and a fourth side, the first and third sides being long sides, while the second and fourth sides being short sides.

5. The keyboard assembly of an electronic product as claimed in claim 4, wherein the light source is disposed at an adjoining section of the first and fourth sides of the photoconduction face.

* * * * *